United States Patent
Bukovitz et al.

(10) Patent No.: US 9,651,073 B2
(45) Date of Patent: May 16, 2017

(54) LOCKING MECHANISM FOR TELESCOPING MEMBERS

(71) Applicant: The Wooster Brush Company, Wooster, OH (US)

(72) Inventors: Richard K. Bukovitz, Orrville, OH (US); John L. Scott, Sr., Wooster, OH (US); Scott A. Melegari, West Salem, OH (US)

(73) Assignee: The Wooster Brush Company, Wooster, OH (US)

( * ) Notice: Subject to any disclaimer, the term of this patent is extended or adjusted under 35 U.S.C. 154(b) by 56 days.

(21) Appl. No.: 14/535,415

(22) Filed: Nov. 7, 2014

(65) Prior Publication Data

US 2015/0139717 A1   May 21, 2015

Related U.S. Application Data

(60) Provisional application No. 61/905,991, filed on Nov. 19, 2013.

(51) Int. Cl.
*F16B 7/14* (2006.01)

(52) U.S. Cl.
CPC ..... *F16B 7/1454* (2013.01); *Y10T 403/32501* (2015.01)

(58) Field of Classification Search
CPC ...... F16B 7/1454; F16B 7/1418; F16B 7/105; Y10T 403/32501; Y10T 403/7071; Y10T 403/32426; Y10T 403/7077; Y10T 403/32467; Y10T 403/595; Y10T 403/7064; B25G 1/04; B25G 1/06; B05C 17/0205; B05C 17/02

USPC ....................................................... 403/109.5
See application file for complete search history.

(56) References Cited

U.S. PATENT DOCUMENTS

| | | | | | |
|---|---|---|---|---|---|
| 2,817,548 | A | * | 12/1957 | Uthemann | A45B 23/00 403/104 |
| 2,849,249 | A | * | 8/1958 | Fridolph | A45B 23/00 248/412 |
| 4,029,279 | A | * | 6/1977 | Nakatani | F16B 7/1454 248/188.5 |
| 4,174,900 | A | * | 11/1979 | Ina | F16M 11/32 248/163.1 |
| 4,185,936 | A | * | 1/1980 | Takahashi | F16B 7/1454 16/DIG. 39 |
| 4,596,484 | A | * | 6/1986 | Nakatani | F16B 7/1454 248/188.5 |

(Continued)

FOREIGN PATENT DOCUMENTS

DE   2632526   1/1978
FR   82947   8/1964

*Primary Examiner* — James Ference
(74) *Attorney, Agent, or Firm* — Renner, Otto, Boisselle & Sklar, LLP (57) ABSTRACT

A locking mechanism for inner and outer telescoping members includes a housing fixedly attached to the axial outer end of the outer telescoping member. A cam member is mounted on the housing for pivotal movement between a locking position applying pressure urging a pressure pad in a radial through opening in the housing against the outer surface of the inner telescoping member to lock the inner telescoping member against axial movement relative to the outer telescoping member, and an unlocking position releasing the applied pressure.

16 Claims, 5 Drawing Sheets

(56) References Cited

U.S. PATENT DOCUMENTS

| | | | | |
|---|---|---|---|---|
| 4,662,771 A * | 5/1987 | Roe | B05C 17/0205 | 403/108 |
| 4,715,089 A * | 12/1987 | Schema | B25G 1/04 | 16/429 |
| 4,761,092 A * | 8/1988 | Nakatani | F16B 7/1454 | 248/188.5 |
| 4,932,622 A * | 6/1990 | Hayakawa | F16B 7/1454 | 248/188.5 |
| 5,154,449 A * | 10/1992 | Suei-Long | A47L 9/244 | 248/413 |
| 5,161,278 A * | 11/1992 | Tomm | A46B 5/0095 | 15/145 |
| 5,288,161 A * | 2/1994 | Graves | B05C 17/0205 | 15/145 |
| 5,662,429 A * | 9/1997 | Battocchio | F16B 7/1418 | 248/354.5 |
| 5,664,904 A * | 9/1997 | Hapgood | F16B 7/0433 | 248/230.4 |
| 5,791,805 A * | 8/1998 | Lynch | B25G 1/04 | 16/429 |
| 6,004,064 A * | 12/1999 | Franz | B62K 25/02 | 301/124.2 |
| 6,142,699 A * | 11/2000 | Pao | F16B 7/1454 | 403/109.5 |
| 6,671,930 B2 * | 1/2004 | Lanz | B25G 1/04 | 16/405 |
| 6,676,329 B2 * | 1/2004 | Mandon | A63C 11/221 | 403/104 |
| 6,874,201 B2 * | 4/2005 | Ta | B05C 17/0205 | 16/427 |
| 6,896,438 B1 * | 5/2005 | Chen | B62K 19/36 | 403/290 |
| 6,957,824 B2 * | 10/2005 | Klar | B60D 1/155 | 280/482 |
| 7,288,117 B2 * | 10/2007 | Benson | A61F 2/76 | 623/27 |
| 7,721,391 B2 * | 5/2010 | Bukovitz | B25G 3/14 | 15/145 |
| 8,257,231 B2 * | 9/2012 | Bingham, Jr. | A63B 21/225 | 24/515 |
| 2002/0026686 A1 * | 3/2002 | Newman | A46B 17/02 | 16/427 |
| 2002/0030146 A1 * | 3/2002 | Akaike | F16M 11/32 | 248/157 |
| 2004/0101351 A1 * | 5/2004 | Pitcher | F16B 7/1454 | 403/109.5 |
| 2005/0126612 A1 * | 6/2005 | Chen | A45B 9/00 | 135/16 |
| 2006/0127167 A1 * | 6/2006 | Hsieh | F16B 2/185 | 403/109.5 |
| 2007/0108756 A1 * | 5/2007 | Laakso | A63C 11/221 | 280/823 |
| 2008/0085150 A1 * | 4/2008 | Wang | B25G 1/04 | 403/109.5 |
| 2008/0131195 A1 * | 6/2008 | Stahle | B25G 1/04 | 403/109.5 |
| 2009/0023559 A1 * | 1/2009 | Bingham, Jr. | A63B 22/00 | 482/57 |
| 2009/0274511 A1 * | 11/2009 | Chen | F16B 7/1427 | 403/109.5 |
| 2010/0139024 A1 * | 6/2010 | Scott, Sr. | B05C 17/02 | 15/230.11 |
| 2010/0170547 A1 * | 7/2010 | Pietrzak | A45B 9/00 | 135/75 |
| 2010/0314524 A1 * | 12/2010 | Fuchs | F16B 7/1454 | 248/519 |
| 2011/0002734 A1 * | 1/2011 | Chen | A47L 13/42 | 403/350 |
| 2011/0236123 A1 * | 9/2011 | Melino, Sr. | F16B 7/1454 | 403/81 |
| 2011/0240078 A1 * | 10/2011 | Lenhart | A45B 9/00 | 135/75 |
| 2012/0305041 A1 * | 12/2012 | Lah | A45B 9/00 | 135/75 |
| 2012/0324682 A1 * | 12/2012 | Ballentine | F16B 7/1454 | 24/535 |

* cited by examiner

LOCKING MECHANISM FOR TELESCOPING MEMBERS

CROSS-REFERENCE TO RELATED APPLICATION

This application claims the benefit of U.S. Provisional Application Ser. No. 61/905,991, filed Nov. 19, 2013, the entire disclosure of which is incorporated herein by reference.

FIELD OF THE INVENTION

This invention relates generally to a locking mechanism for releasably locking a pair of telescoping members in axially adjusted positions relative to one another.

BACKGROUND

It is generally known to provide telescoping members with locking mechanisms that allow for axial adjustment of the telescoping members relative to one another. However, there is an ongoing need for a locking mechanism for telescoping members that is relatively inexpensive to manufacture and easy to assemble onto the telescoping members.

SUMMARY OF THE INVENTION

The present invention relates to a locking mechanism for inner and outer telescoping members. The locking mechanism comprises a housing having an inner end portion fixedly attached to an axial outer end of the outer telescoping member, and an outer end portion extending axially outwardly beyond the axial outer end of the outer telescoping member. The outer end portion of the housing has an axial opening through which the inner telescoping member is axially slidably received in the outer telescoping member and is retained against rotational movement relative to the housing.

In accordance with one aspect, the outer end portion of the housing has a radial through opening in which a pressure pad is slidably received. A cam member is mounted on the housing for pivotal movement between a locking position applying pressure urging the pressure pad against the outer surface of the inner telescoping member to lock the inner telescoping member against axial movement relative to the outer telescoping member, and an unlocking position releasing the applied pressure to allow axial movement of the inner telescoping member relative to the outer telescoping member.

In accordance with another aspect, the inner telescoping member has an axial outer surface against which the pressure pad is pressed during movement of the cam member to the locking position to lock the inner telescoping member against movement relative to the outer telescoping member.

In accordance with another aspect, the pressure pad may comprise a rigid member to which pressure is applied by the cam member during movement to the locking position, and a compressible engagement pad interposed between the rigid member and inner telescoping member that directly engages the axial outer surface of the inner telescoping member during movement of the cam member to the locking position to provide a gripping action therebetween.

In accordance with another aspect, a plurality of circumferentially spaced ribs may be provided on the inner surface of the inner end portion of the housing that are received in complementary shaped slots or holes in the outer telescoping member for preventing relative rotation therebetween.

In accordance with another aspect, a locking ring having an inner interfering surface is engageable with an outer interfering surface on the inner end portion of the housing when forced thereover to secure the circumferentially spaced ribs on the inner surface of the outer end portion of the housing in the complementary shaped slots or holes in the outer telescoping member.

These and other objects, advantages, features and aspects of the present invention will become apparent as the following description proceeds.

DETAILED DESCRIPTION

Figure 1:
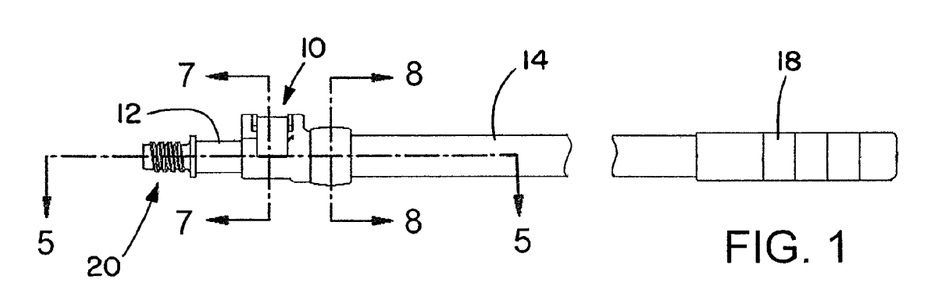
FIG. 1 is a side elevation view of an exemplary locking mechanism of the present invention associated with a pair of telescoping members for releasably locking the telescoping members in axially adjusted positions relative to one another.
Figure 2:
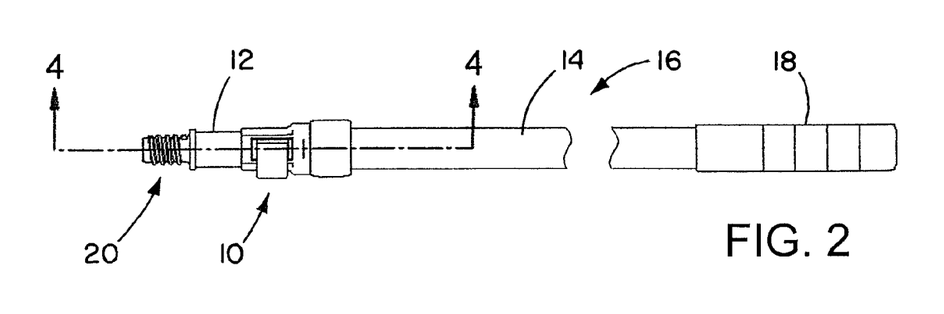
FIG. 2 is a top plan view of the locking mechanism and associated telescoping members of FIG. 1.
Figure 3:
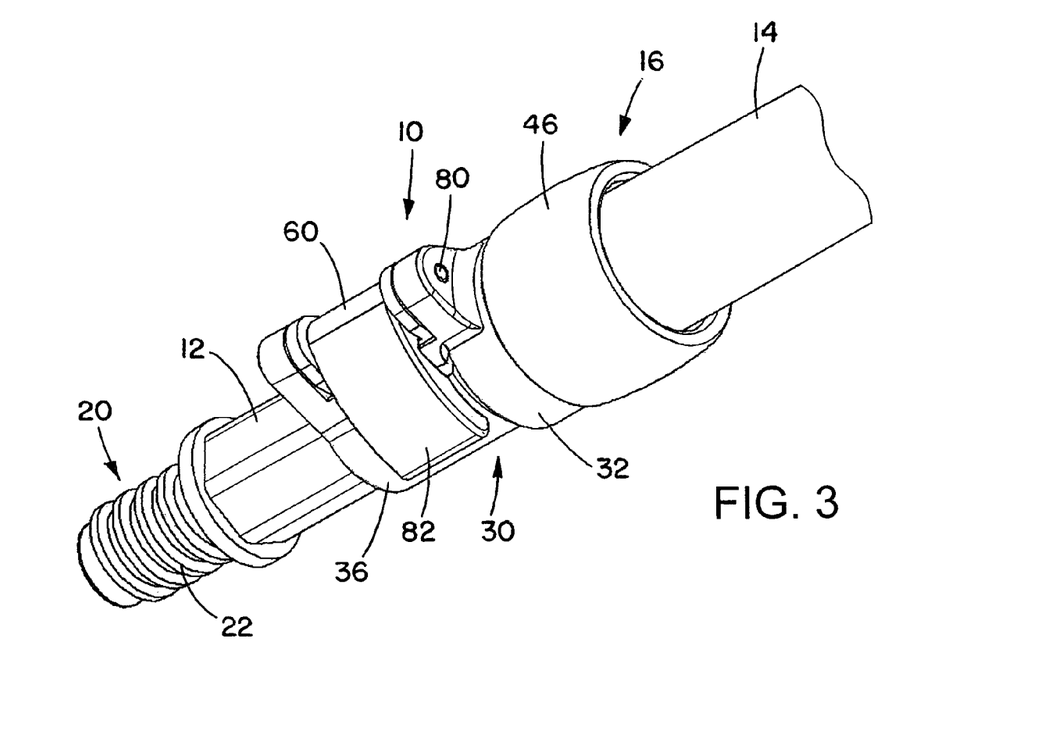
FIG. 3 is an enlarged fragmentary perspective view of the locking mechanism and associated telescoping members of FIGS. 1 and 2, showing the locking mechanism in its fully engaged, locked position.

Referring now in detail to the drawings, wherein like reference numerals are used to designate like parts, and initially to FIGS. 1-3, there is shown an exemplary embodiment of a locking mechanism 10 for releasably locking a pair of inner and outer telescoping members 12 and 14 of an extension pole 16 in axially adjusted positions relative to one another. The outer telescoping member 14 may be generally circular in cross section and has an inner diameter sufficiently greater than the maximum outer dimensions of the inner telescoping member for telescoping receipt of the inner telescoping member within the outer telescoping member. Both telescoping members are desirably made of a suitable lightweight material, including, but not limited to extruded aluminum. Also the inner telescoping member may, but need not be, of a lighter gauge material than the outer telescoping member.

To aid in gripping the extension pole 16, the axial inner end of the outer telescoping member 14 may be provided with a suitable hand grip 18. An extension pole tip 20 having for example a standard external thread 22 on the outer surface thereof may be suitably affixed to the axial outer end of the inner telescoping member 12 to permit the extension pole to be threadedly connected to tool handles having standard internally threaded sockets. Alternatively, the outer surface of the extension pole tip 20 may have circumferentially spaced axially extending thread segments to permit the extension pole to be threadedly connected to tool handles having standard internally threaded sockets and to provide for the quick and easy attachment (and removal) of the extension pole to tool handles having compatible quick release lock engaging end portions as disclosed for example in U.S. Pat. No. 7,721,391, the entire disclosure of which is incorporated herein by reference. The extension pole tip may be made, for example, of fiberglass reinforced nylon or other suitable material.

Referring further to FIG. 3 and also to FIGS. 4-8, the locking mechanism 10 comprises a housing 30 having an inner end portion 32 fixedly attached to the axial outer end 34 of the outer telescoping member 14 and an outer end portion 36 extending axially outwardly beyond the axial outer end of the outer telescoping member containing an axial opening 38 through which the inner telescoping member 12 is axially slidably received in the outer telescoping member.

Figure 5:
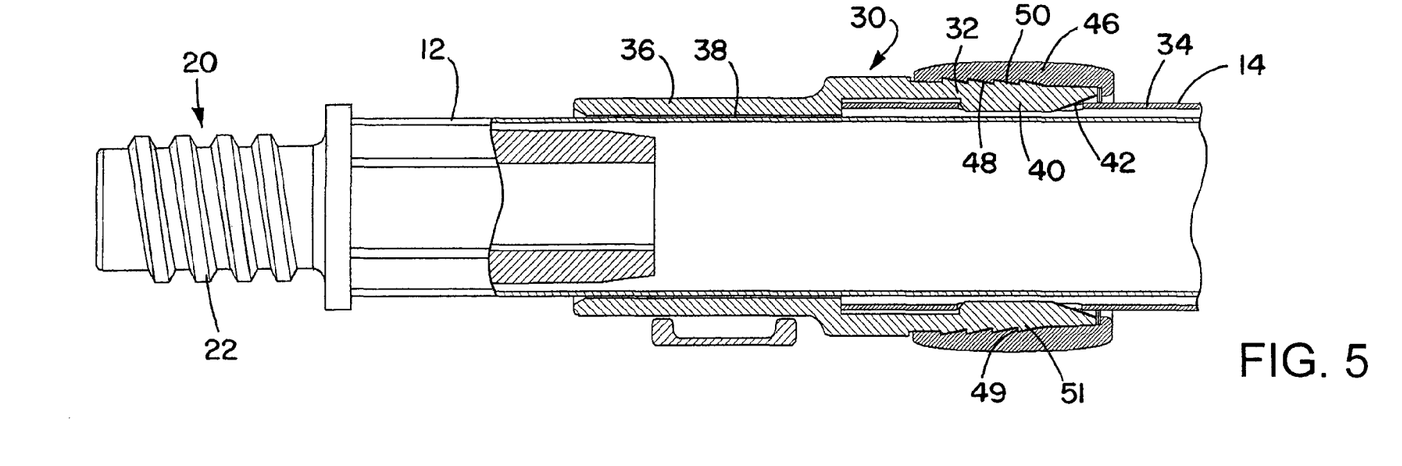
FIG. 5 is an enlarged fragmentary longitudinal section through the locking mechanism and associated telescoping members of FIG. 1, taken on the plane of the line 5-5 thereof.
Figure 6:
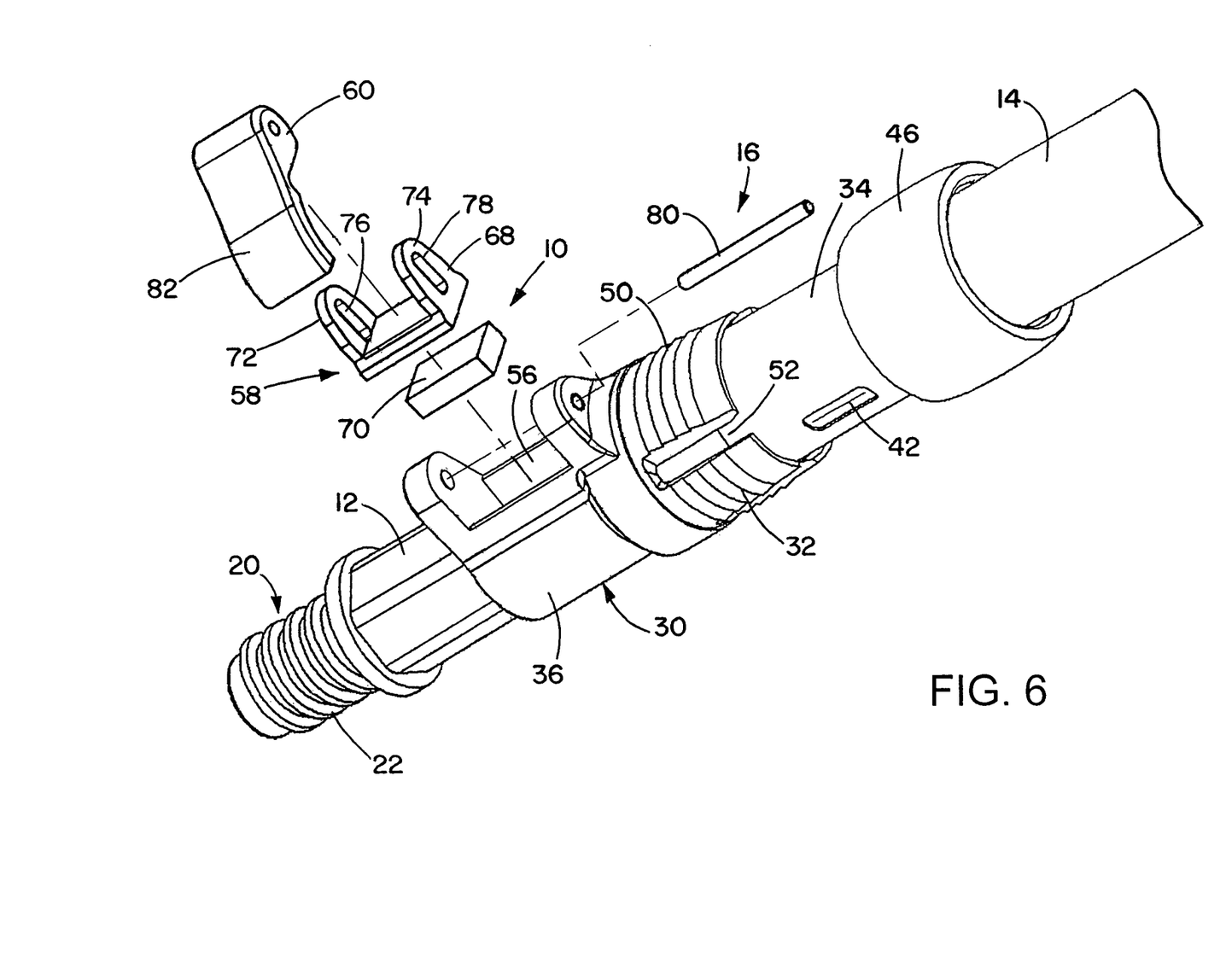
FIG. 6 is an enlarged, partially exploded perspective view of the locking mechanism and associated telescoping members of FIG. 3.
Figures 7, 8, 9:
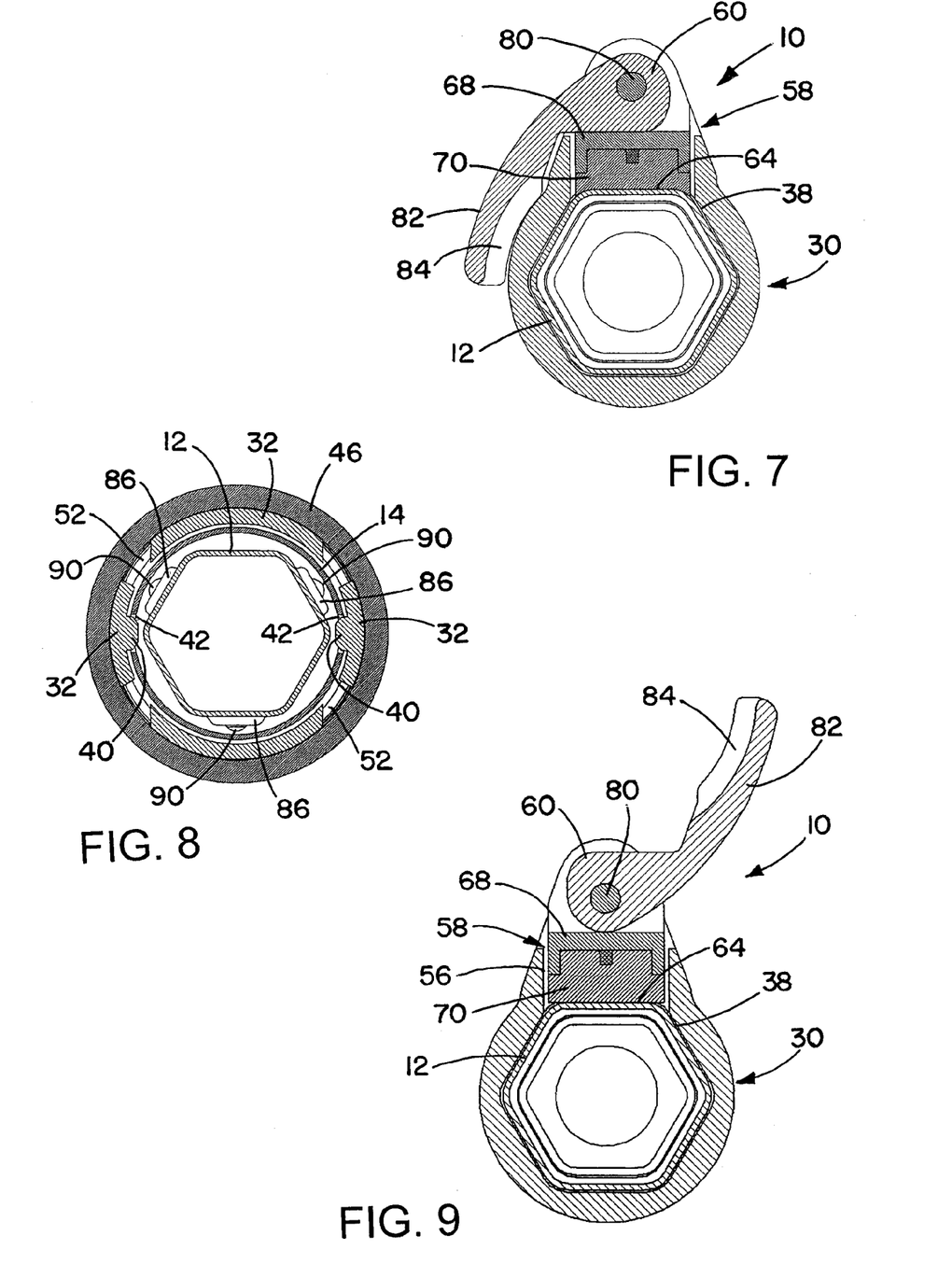
FIG. 7 is an enlarged transverse section through the locking mechanism and associated telescoping members of FIG. 1, taken on the plane of the line 7-7 thereof, showing the locking mechanism in its fully engaged, locked position.
FIG. 8 is an enlarged transverse section through the locking mechanism and associated telescoping members of FIG. 1, taken on the plane of the line 8-8 thereof.
FIG. 9 is an enlarged transverse section through the locking mechanism and associated telescoping members similar to FIG. 7, but showing the locking mechanism in its fully disengaged, unlocked position.

In the exemplary embodiment disclosed herein, the inner end portion 32 of the housing 30 is fixedly attached to the axial outer end 34 of the outer telescoping member 14 by providing a plurality of circumferentially spaced ribs 40 on the inner surface of the inner end portion of the housing that are received in complementary shaped slots or holes 42 in the outer telescoping member as shown in FIGS. 5, 6 and 8. FIG. 8 shows two such slots or holes 42 spaced 180° apart adjacent the outer end of the outer tubular member for engagement by two complementary shaped ribs 40 on the inner surface of the inner end portion of the housing. However, more or less than two such slots or holes and associated ribs may be provided for fixedly attaching the housing to the outer telescoping member if desired.

Figure 4:
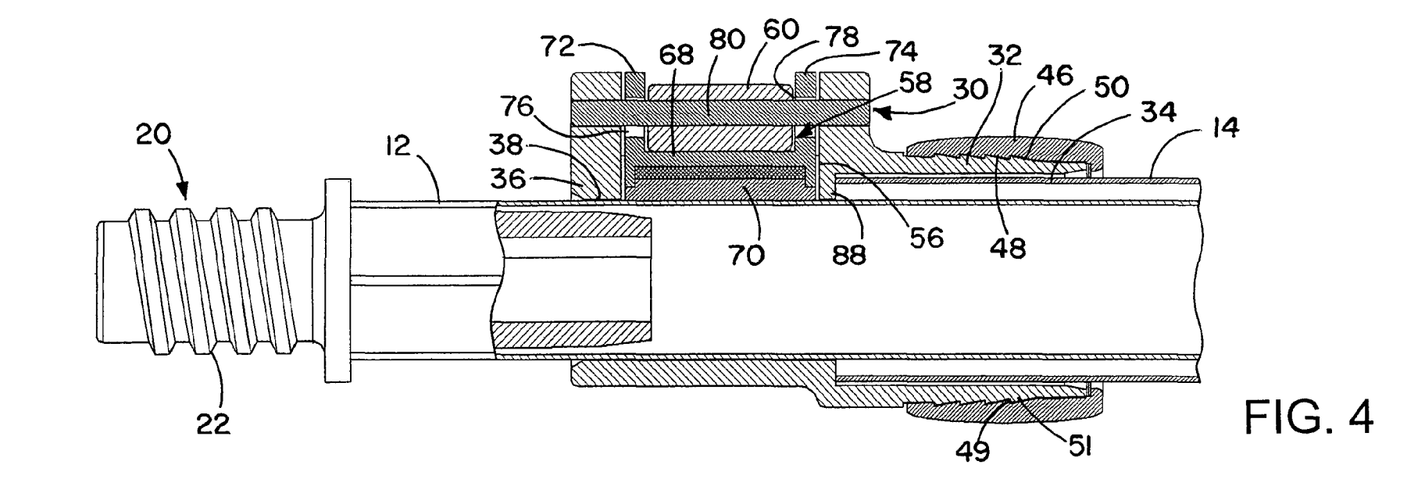
FIG. 4 is an enlarged fragmentary longitudinal section through the locking mechanism and associated telescoping members of FIG. 2, taken on the plane of the line 4-4 thereof.

To prevent the ribs 40 on the inner surface of the inner end portion 32 of the housing 30 from disengaging from the slots or holes 42 in the outer end portion of the outer telescoping member when thus assembled, a locking ring 46 having an interfering inner surface 48 engageable with an outer interfering surface 50 on the inner end portion of the housing is forced thereover as shown in FIGS. 4 and 5. In the exemplary embodiment disclosed herein, the interfering surfaces of the locking ring and housing are oppositely tapered and have respective overlapping ribs 49 and 51 that prevent removal of the locking ring from the inner end portion of the housing when forced thereover except by breaking the locking ring component.

Both the housing 30 and the locking ring component 46 may be made of a suitable polymeric material. Also the inner end portion 32 of the housing 30 may have circumferentially spaced, longitudinally extending slots 52 (see FIGS. 6 and 8) to permit the inner end portion of the housing to flex radially outward during assembly of the inner end portion of the housing over the outer end of the outer telescoping member and facilitate radial inward flexing of the inner end portion of the housing when the locking ring is forced thereover.

The outer end portion 36 of housing 30 contains a radial through opening 56 in which a pressure pad 58 is slidably received. Mounted on the housing 30 is a cam member 60 for pivotal movement between a locking position shown in FIGS. 3 and 7 for applying pressure urging the pressure pad 58 against the outer surface of the inner telescoping member 12 to lock the inner telescoping member against axial movement relative to the outer telescoping member, and an unlocking position shown in FIGS. 9 and 10 releasing the applied pressure to allow axial movement of the inner telescoping member relative to the outer telescoping member.

Preferably the radial through opening 56 in the outer end portion of the housing is in radial alignment with a substantially flat axially extending outer surface 64 of the inner telescoping member 12, whereby when the cam member 60 is moved to the locking position shown in FIG. 7 applying pressure to the pressure pad 58, the pressure pad is urged against the substantially flat axial outer surface of the inner telescoping member to lock the inner telescoping member in place by clamping the inner telescoping member between the pressure pad and the opposite side of the housing.

In the non-limiting example disclosed herein, the pressure pad 58 comprises a relatively rigid member 68 to which pressure is applied by the cam member 60 during movement of the cam member to the locking position, and a compressible engagement pad 70 interposed between the rigid member 68 and the inner telescoping member 12 that directly engages the substantially flat outer surface 64 of the inner telescoping member to provide a gripping action therebetween. The engagement pad 70 may be made of a relatively high coefficient of friction material including but not limited to a thermoplastic polymer to provide additional friction and take up the clearances when the cam member is engaged.

Relative rotation between the housing 30 and inner telescoping member 12 may be prevented as by making the inner telescoping member non-circular in cross section (for example, hex shape) and making the opening 38 in the housing of a corresponding non-circular shape as shown in FIGS. 7 and 9.

Alternatively, the outer surface of the inner telescoping member may be rounded and secured against both axial and rotational movement relative to the outer telescoping member due to the frictional gripping action of the compressible engagement pad against the inner telescoping member upon movement of the cam member to the locking position.

Figure 10:
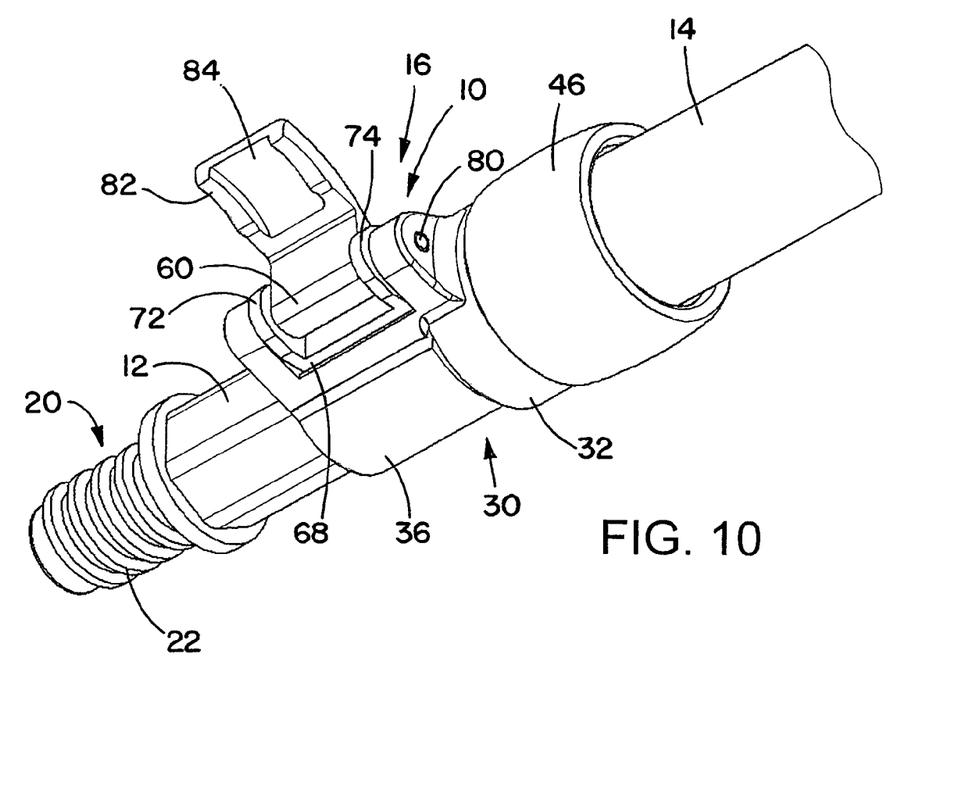
FIG. 10 is an enlarged fragmentary perspective view of the locking mechanism and associated telescoping members similar to FIG. 3, but showing the locking mechanism in its fully disengaged, unlocked position.

The rigid member 68 has a pair of laterally spaced flanges 72, 74 with aligned radial slots 76, 78 therein through which a pivot pin 80 (that pivotally connects the cam member 60 to the housing 30) extends to allow limited radial movement of the pressure pad 58 within the radial through opening 56, whereby when the cam member is disengaged as shown in FIGS. 9 and 10, the pressure pad will float within the radial through opening to allow the inner telescoping member to slide freely within the housing, as well as provide component stack up tolerance acceptance.

The pivotal connection between the cam member 60 and housing 30 extends axially relative to the telescoping members, whereby the cam member rotates in a transverse direction relative to the axes of the telescoping member. To facilitate rotation of the cam member, the cam member has a radially outwardly protruding arm 82 that is desirably shaped to substantially conform to the outer surface of the housing when the cam member is in the fully locked position as shown in FIGS. 3 and 7. The underside 84 of the cam arm

82 may have a convex shape to facilitate insertion of an operator's finger underneath the cam arm for ease of movement of the cam member from the fully engaged, locked position shown in FIGS. 3 and 7 to the fully disengaged, unlocked position shown in FIGS. 9 and 10.

To prevent the inner telescoping member 12 from being pulled completely out of the outer telescoping member 14, one or more circumferentially spaced ribs 86 may be provided on the outer surface of the inner telescoping member adjacent the axial inner end thereof which make contact with an inner flange 88 (see FIG. 4) of the housing when the inner telescoping member is fully extended. Three such circumferentially spaced elongated ribs 86 are shown on the outer surface of the inner telescoping member in FIG. 8. However, a greater or lesser number of elongated ribs may be provided if desired. Also a plurality of circumferentially spaced rounded bumps 90 may be provided on the outer surface of the inner telescoping member adjacent the axial inner end thereof as further shown in FIG. 8 to help keep the inner telescoping member centered relative to the outer telescoping member and give the inner telescoping member more stability when fully extended.

Although the invention has been shown and described with respect to a certain embodiment, equivalent alterations and modifications will become apparent upon the reading and understanding of the specification. In particular, with regard to the various functions performed by the above-described components, the terms used to describe such components are intended to correspond, unless otherwise indicated, to any component which performs the specified function of the described component (e.g., that is functionally equivalent), even though not structurally equivalent to the exemplary embodiment. In addition, while a particular feature may have been disclosed with respect to only one embodiment, such feature may be combined with one or more other features as may be desired or advantageous for any given or particular application.

What is claimed is:

1. A locking mechanism for releasably locking inner and outer telescoping members in axially adjusted positions relative to one another, the outer telescoping member being tubular for axial sliding receipt of the inner telescoping member, the locking mechanism comprising a housing fixedly attached to an axial outer end of the outer telescoping member, the housing having an axial opening through which the inner telescoping member is axially slidably received in the outer telescoping member, a radial opening through an outer end portion of the housing in radial alignment with an axially extending outer surface of the inner telescoping member, a pressure pad slidably received in the radial opening, and a cam member mounted on the housing for pivotal movement between a locking position applying pressure urging the pressure pad against the axial outer surface of the inner telescoping member to lock the inner telescoping member against axial movement relative to the outer telescoping member, and an unlocking position releasing the applied pressure to allow axial movement of the inner telescoping member relative to the outer telescoping member, wherein the pressure pad includes a pair of laterally spaced apart flanges having aligned radial slots through which a pivot pin that pivotally connects the cam member to the housing extends, the radial slots being oversized in relation to the pivot pin to allow limited yet constrained radial movement of the pressure pad within the radial opening in the housing, whereby when the cam member is moved to the unlocking position, the pressure pad will float within the radial opening to allow the inner telescoping member to slide freely within the housing, and wherein the pressure pad comprises a rigid member to which pressure is applied by the cam member during movement of the cam member to the locking position, and a compressible engagement pad interposed between the rigid member and the inner telescoping member that directly engages the axial outer surface of the inner telescoping member during movement of the cam member to the locking position to provide a gripping action therebetween.

2. The locking mechanism of claim 1, wherein the compressible engagement pad is made of a thermoplastic polymer.

3. The locking mechanism of claim 2, wherein the rigid member is made of a polymeric material.

4. The locking mechanism of claim 1, wherein the pivotal connection between the cam member and the housing extends axially relative to the telescoping members, whereby the cam member rotates in a transverse direction relative to the axes of the telescoping members.

5. The locking mechanism of claim 4, wherein the cam member has a radially outwardly protruding arm shaped to substantially conform to an outer surface of the housing when the cam member is in the locked position.

6. The locking mechanism of claim 1, wherein an inner surface of the inner end portion of the housing has a plurality of circumferentially spaced ribs that are received in complementary shaped slots or holes adjacent the axial outer end of the outer telescoping member for fixedly attaching the inner end portion of the housing to the axial outer end of the outer telescoping member.

7. The locking mechanism of claim 6, further comprising a locking ring having an inner interfering surface engageable with an outer interfering surface on the inner end portion of the housing when forced thereover to secure the circumferentially spaced ribs on the inner surface of the inner end portion of the housing in the complementary shaped slots or holes adjacent the axial outer end of the outer telescoping member.

8. The locking mechanism of claim 7, wherein the interfering surfaces of the locking ring and the housing are oppositely tapered.

9. The locking mechanism of claim 7, wherein the interfering surfaces of the locking ring and the housing have overlapping ribs that prevent removal of the locking ring from the inner end portion of the housing when forced thereover.

10. The locking mechanism of claim 7, wherein the inner end portion of the housing has circumferentially spaced, axially extending slots to permit radial outward flexing of the inner end portion of the housing during assembly of the inner end portion of the housing over the axial outer end of the outer telescoping member and radial inward flexing of the inner end portion of the housing when the locking ring is forced thereover.

11. The locking mechanism of claim 6, wherein the housing is a plastic molded part, and the ribs are an integrally molded part of the housing.

12. The locking mechanism of claim 1, wherein the axial outer surface of the inner telescoping member against which the pressure pad is urged upon movement of the cam member to the locking position is substantially flat.

13. A locking mechanism for releasably locking inner and outer telescoping members in axially adjusted positions relative to one another, the locking mechanism comprising a housing having an inner end portion extending over an axial outer end of the outer telescoping member, the housing having an axial opening through which the inner telescoping member is axially slidably received in the outer telescoping member, a radial opening through the housing in which a pressure pad is slidably received, a cam member mounted on the housing for pivotal movement between a locking position applying pressure urging the pressure pad against the outer surface of the inner telescoping member to lock the inner telescoping member against axial movement relative to the outer telescoping member, and an unlocking position releasing the applied pressure to allow axial movement of the inner telescoping member relative to the outer telescoping member, a plurality of circumferentially spaced ribs on an inner surface of the inner end portion of the housing that are received in complementary shaped slots or holes in the axial outer end of the outer tubular member for fixedly attaching the inner end portion of the housing to the axial outer end of the outer tubular member, and a locking ring having an inner interfering surface engageable with an outer interfering surface on the inner end portion of the housing when forced thereover to secure the circumferentially spaced ribs on the inner surface of the inner end portion of the housing in the complementary shaped slots or holes adjacent the axial outer end of the outer telescoping member.

14. The locking mechanism of claim 13, wherein the interfering surfaces of the locking ring and the housing are oppositely tapered.

15. The locking mechanism of claim 13, wherein the interfering surfaces of the locking ring and the housing have overlapping ribs that prevent removal of the locking ring from the inner end portion of the housing when forced thereover.

16. The locking mechanism of claim 13, wherein the inner end portion of the housing has circumferentially spaced, axially extending slots to permit radial outward flexing of the inner end portion of the housing during assembly of the inner end portion of the housing over the axial outer end of the outer telescoping member and radial inward flexing of the inner end portion of the housing when the locking ring is forced thereover.

\* \* \* \* \*